(12) United States Patent
Nevarez et al.

(10) Patent No.: US 8,074,837 B2
(45) Date of Patent: Dec. 13, 2011

(54) METHOD AND SYSTEM FOR PORTIONING AND DISPENSING ICE

(75) Inventors: Roberto Nevarez, Hudson, FL (US); William E. Smith, Land O' Lakes, FL (US); Jan Claesson, Land O' Lakes, FL (US)

(73) Assignee: Enodis Corporation, New Port Richey, FL (US)

( * ) Notice: Subject to any disclaimer, the term of this patent is extended or adjusted under 35 U.S.C. 154(b) by 0 days.

(21) Appl. No.: 12/633,786

(22) Filed: Dec. 8, 2009

(65) Prior Publication Data
US 2010/0314407 A1     Dec. 16, 2010

Related U.S. Application Data

(60) Provisional application No. 61/120,772, filed on Dec. 8, 2008.

(51) Int. Cl.
*B67D 1/00* (2006.01)

(52) U.S. Cl. ............ 222/56; 222/1; 222/52; 222/108; 222/144; 222/146.6; 222/236; 222/367

(58) Field of Classification Search ............ 222/108, 222/144.5, 144, 145.1, 146.6, 236, 185.1, 222/239, 244, 330, 333, 367, 56, 1, 52, 63; 62/332, 337, 344, 459; 141/351, 360, 361
See application file for complete search history.

(56) References Cited

U.S. PATENT DOCUMENTS

| | | | |
|---|---|---|---|
| 2,653,733 A | 9/1953 | Rudd et al. | 222/145 |
| 3,101,872 A | 8/1963 | Dickinson | 222/197 |
| 4,083,462 A | 4/1978 | Teske et al. | 214/17 D |
| 4,276,750 A | 7/1981 | Kawasumi | 62/137 |
| 4,392,588 A | 7/1983 | Scalera | 222/129.4 |
| 4,531,380 A | 7/1985 | Hagen | 62/320 |
| 4,610,145 A | 9/1986 | Arzberger et al. | 62/127 |
| 4,638,875 A | 1/1987 | Murray | 177/1 |
| 4,708,487 A | 11/1987 | Marshall | 366/206 |
| 4,790,240 A | 12/1988 | Henn et al. | 99/282 |
| 4,941,593 A | 7/1990 | Hicks et al. | 222/148 |
| 4,962,866 A | 10/1990 | Phillips | 221/8 |
| 5,067,819 A | 11/1991 | Heinhold et al. | 366/138 |

(Continued)

FOREIGN PATENT DOCUMENTS

EP    1690481    8/2006

OTHER PUBLICATIONS

International Search Report from the related International Application No. PCT/US2009/067227 dated Feb. 17, 2010.

(Continued)

*Primary Examiner* — Frederick C. Nicolas
(74) *Attorney, Agent, or Firm* — Ohlandt, Greeley, Ruggiero & Perle, L.L.P.

(57) ABSTRACT

An ice portion control module includes an ice bin for storing ice. A base in the ice bin has one or more portion control compartments. The one or more portion control compartments has an interior volume to hold a predetermined portion of the ice. An actuator moves the one or more portion control compartments between a fill position wherein the one or more portion control compartments holds the ice, and a dispense position wherein the predetermined portion of the ice is dispensed out of the one or more portion control compartments.

33 Claims, 10 Drawing Sheets

U.S. PATENT DOCUMENTS

| | | | |
|---|---|---|---|
| 5,068,116 A | 11/1991 | Gibney et al. | 426/231 |
| 5,104,007 A * | 4/1992 | Utter | 222/146.6 |
| 5,280,845 A * | 1/1994 | Leight | 221/2 |
| 5,619,901 A | 4/1997 | Reese et al. | 99/275 |
| 5,683,011 A | 11/1997 | Miliani | 222/56 |
| 5,690,253 A | 11/1997 | LaFleur | 222/102 |
| 5,934,516 A * | 8/1999 | Strycharske et al. | 222/158 |
| 5,960,701 A | 10/1999 | Reese et al. | 99/275 |
| 6,490,872 B1 | 12/2002 | Beck et al. | 62/303 |
| 6,607,096 B2 | 8/2003 | Glass et al. | 222/100 |
| 6,684,646 B2 | 2/2004 | Vouté et al. | 62/66 |
| 6,945,157 B2 | 9/2005 | Brown et al. | 99/275 |
| 7,207,506 B1 | 4/2007 | Dickson, Jr. et al. | 241/21 |
| 7,237,691 B2 | 7/2007 | Danby et al. | 222/105 |
| 7,325,485 B2 | 2/2008 | Carhuff et al. | 99/452 |
| 7,383,966 B2 | 6/2008 | Ziesel | 222/100 |
| 7,614,524 B2 | 11/2009 | Girard et al. | 222/129.4 |
| 7,748,571 B2 * | 7/2010 | Goff et al. | 222/146.6 |
| 2005/0183426 A1 | 8/2005 | Learned | 426/565 |
| 2005/0242120 A1 | 11/2005 | Sato et al. | 99/290 |
| 2007/0095859 A1 | 5/2007 | Maser et al. | 222/148 |
| 2007/0205220 A1 | 9/2007 | Rudick et al. | 222/129.4 |
| 2007/0205221 A1 | 9/2007 | Carpenter et al. | 222/129.4 |
| 2008/0093382 A1 | 4/2008 | Sher et al. | 222/129.1 |
| 2008/0279040 A1 | 11/2008 | Neilson | 366/138 |

OTHER PUBLICATIONS

International Search Report issued Dec. 21, 2010 in the related International Application No. PCT/US2010/054317.

* cited by examiner

METHOD AND SYSTEM FOR PORTIONING AND DISPENSING ICE

CROSS-REFERENCED APPLICATION

This application claims priority to U.S. Provisional Application No. 61/120,772, filed on Dec. 8, 2008, which is incorporated herein by reference in its entirety.

BACKGROUND OF THE INVENTION

1. Field of the Invention

The present disclosure relates generally to a method and apparatus for portioning and dispensing ice. More particularly, the present disclosure relates to a portion control module that portions and dispenses ice into a container.

2. Description of Related Art

Multiple steps are involved in creating a beverage or drink, for example, a smoothie drink, from beginning to end, and potential issues can occur at all stages. Smoothie making requires the use of blender pots to create the drink, meaning that the operator is required to purchase, maintain, and then store small wares (blender pots). Limitations of current technology also require the labor intensive transportation of ice to the smoothie machine from a separate icemaking machine in order to maintain a level of usable ice in the smoothie machine. This ice transfer is an issue for many reasons. First, labor is required to transport the ice typically from a back storage room to the point of sale (POS) counter area of a restaurant, where the smoothie machines are typically located. This ice transfer can create a safety hazard for employees who could slip and fall on wet floors or injure themselves by improperly carrying a heavy bucket. It can also increase the likelihood of ice contamination through mishandling.

Once the ice is stocked, the employee must manually add an estimated amount to the blender pot. Since the amount of ice is not measured, but rather "guesstimated" by each employee, this ingredient is not precise and, therefore, makes it difficult to create the same franchised drink time after time.

Accordingly, it has been determined by the present disclosure, there is a need for an assembly that uniformly portions and dispenses ice.

SUMMARY

An ice portion control module is provided that includes an ice bin for storing ice. A base in the ice bin has one or more portion control compartments. The one or more portion control compartments has an interior volume to hold a predetermined portion of the ice. An actuator moves the one or more portion control compartments between a fill position wherein the one or more portion control compartments holds the ice, and a dispense position wherein the predetermined portion of the ice is dispensed out of the one or more portion control compartments.

The base may be formed by a pair of oppositely disposed first and second plates. The one or more portion control compartments may be formed by at least one sidewall disposed between the first and second plates. The first plate may comprise one or more openings associated with the one or more portion control compartments to allow the ice to move from the ice bin into the one or more portion control compartments when the one or more portion control compartments is in the fill position.

The second plate may have a dispensing aperture in communication between the one or more portion control compartments and a dispensing apparatus in the dispensing position, thereby allowing the predetermined portion of the ice in the one or more portion control compartments to be dispensed into the dispensing apparatus. The first plate may be rotatable over the second plate to rotate the one or more portion control compartments. The second plate may be stationary while the first plate rotates. The one or more portion control compartments may have a dispensing port that is covered by the second plate in the fill position. The one or more portion control compartments may rotate on the second plate so that the dispensing port of the one or more portion control compartments passes over the dispensing aperture in the second plate in the dispense position thereby allowing the predetermined portion of the ice in the one or more portion control compartments to be dispensed into the dispensing apparatus. The second plate may have a plurality of drainage holes which allow for water to drain from the ice.

A sensor may detect and communicate to a controller when the one or more portion control compartments is in the dispense position. The first plate may be connected to a drive assembly by a connector bar to rotate the one or more portion control compartments. The connector bar may connect to a structure having one or more protrusions that corresponds to and rotates with the one or more portion control compartments and communicates with the sensor when the one or more portion control compartments is in the dispense position. The first plate may be connected to a drive assembly by a connector bar to rotate the one or more portion control compartments, and further comprise one or more signaling devices disposed on the first plate corresponding to the one or more portion control compartments to enable the sensor to provide a signal in communication with the controller. The controller may count a number of the one or more portion control compartments that pass over the dispensing aperture so that the ice from the one or more portion control compartments is dispensed out of the ice portion control module. The one or more signaling devices may be one or more magnets.

An agitator may move in the ice bin. The first plate may be connected to a drive assembly by a connector bar to rotate the portion control compartment. The drive assembly may be connected to an agitator to move the agitator in the ice bin, where the drive assembly moves in a first direction and a second direction, and where the drive assembly engages the connector bar to move the one or more portion control compartments in the first direction and the drive assembly only engages the agitator to move the agitator through the ice in the ice bin in the second direction.

A leveling blade may ensure a consistent volume of the ice in the one or more portion control compartments. The leveling blade may be substantially planar and substantially parallel with the first plate at a preselected height above the one or more portion control compartments, where the leveling blade has a protrusion that extends from a body portion, and where the protrusion is substantially planar and extends in a direction substantially parallel with the first plate.

A method for portioning ice is also provided that includes filling an interior volume of a portion control compartment in a base with a predetermined portion of ice when the portion control compartment is in a fill position, the base being in an ice bin for storing the ice; and moving the portion control compartment between the fill position and a dispense position.

The base may have one or more portion control compartments; and a dispensing aperture in communication between a selected portion control compartment and the dispensing aperture in the dispense position. The base may be formed by a pair of oppositely disposed first and second plates, where the one or more portion control compartments is formed by at least one sidewall disposed between the first and second plates, and where the first plate comprises an opening associated with the one or more portion control compartments to allow the ice to move from the ice bin into the one or more portion control compartments when the one or more portion control compartments is in the fill position. The moving may comprise rotating the first plate and the sidewall, while the second plate remains stationary so that the dispensing aperture that is disposed within the second plate allows the predetermined portion of the ice in the one or more portion control compartments to be removed therefrom when the one or more dispensing ports of the one or more portion control compartments is aligned with the dispensing aperture in the dispense position. The one or more portion control compartments may be a plurality of portion control compartments and the dispensing aperture may be a plurality of dispensing apertures disposed within the second plate, where the moving comprises rotating the first plate and the sidewall of each of the plurality of portion control compartments, while the second plate remains stationary so that each of the plurality of portion control compartments aligns with one of the plurality of dispensing apertures in the dispense position to allow the predetermined portion of the ice in each of the plurality of portion control compartments to be removed therefrom.

Controlling a portion of the ice dispensed from the ice bin may be by controlling a number of the one or more dispensing ports of the one or more portion control compartments that align with the dispensing aperture. The controlling may comprise counting a number of the one or more dispensing ports of the one or more portion control compartments that align with the dispensing aperture as the one or more portion control compartments are rotated. The controlling may further comprise detecting and communicating to a controller when each of the one or more portion control compartments is in the dispense position, where the first plate is connected to a drive assembly by a connector bar to move the one or more portion control compartments, where the connector bar connects to a structure having one or more protrusions that rotates with the connector bar, where the one or more protrusions corresponds to and rotates with the one or more portion control compartments and communicates with a sensor when the one or more portion control compartments is in the dispense position. The controlling may further comprise detecting and communicating to a controller when each of the one or more portion control compartments is in the dispense position, where the first plate is connected to a drive assembly by a connector bar to rotate the one or more portion control compartments, and one or more signaling devices that are disposed on the first plate corresponding to the one or more portion control compartments to enable a sensor to provide a signal in communication with a controller. The one or more signaling devices may be one or more magnets.

The method may further comprise draining water disposed within each of the one or more portion control compartments through a plurality of holes through the second plate. The interior volume of the portion control compartment may be filled with the ice from the ice bin, and further comprise passing a leveling blade over the opening associated with the one or more portion control compartments closing off the opening as the one or more portion control compartments moves towards the dispensing aperture, thereby ensuring that a consistent portion of the ice is present in the one or more portion control compartments before it releases its contents into the dispensing aperture.

The method may further comprise moving an agitator through the ice in the ice bin. The first plate may be connected to a drive assembly by a connector bar to rotate the portion control compartment, where the drive assembly is connected to an agitator to move the agitator in the ice bin, where the drive assembly moves in a first direction and a second direction, and where the drive assembly engages the connector bar to move the portion control compartment in the first direction and the drive assembly only engages the agitator to move the agitator through the ice in the ice bin in the second direction.

An ice portion control module is further provided that includes an ice bin for storing ice that has at least one sloped wall to direct ice into one or more portion control compartments. The one or more portion control compartments has one or more dispensing ports. One or more actuators move one or more devices to open and close the one or more portion control compartments and one or more dispensing ports. The one or more portion control compartments holds the ice when the one or more dispensing ports is closed, and whereby the ice in the one or more portion control compartments is dispensed out of the one or more dispensing ports when opened by an actuation of the one or more actuators.

An agitator may moves in the ice bin. The one or more actuators may be in communication with a controller that counts a number of actuations to determine a portion as required by a menu recipe or beverage formula.

An ice portion control module is also provided that includes an ice bin for storing ice from which ice is directed into one or more portion control compartments. The one or more portion control compartments has one or more dispensing ports. An agitator moves in the ice bin. One or more actuators move one or more devices to open and close the one or more portion control compartments and one or more dispensing ports. The one or more portion control compartments holds the ice when the one or more dispensing ports is closed, and whereby a predetermined portion of ice in the one or more portion control compartments is dispensed out of the one or more dispensing ports when opened by an actuation of the one or more actuators. The one or more actuators may be in communication with a controller that counts a number of actuations to determine a portion of the ice as required by the menu recipe or beverage formula. The agitator may prevent ice from congealing and facilitates the direction of ice into one or more portion control compartments.

The above-described and other advantages and features of the present disclosure will be appreciated and understood by those skilled in the art from the following detailed description, drawings, and appended claims.

DETAILED DESCRIPTION OF THE INVENTION

Figure 1:
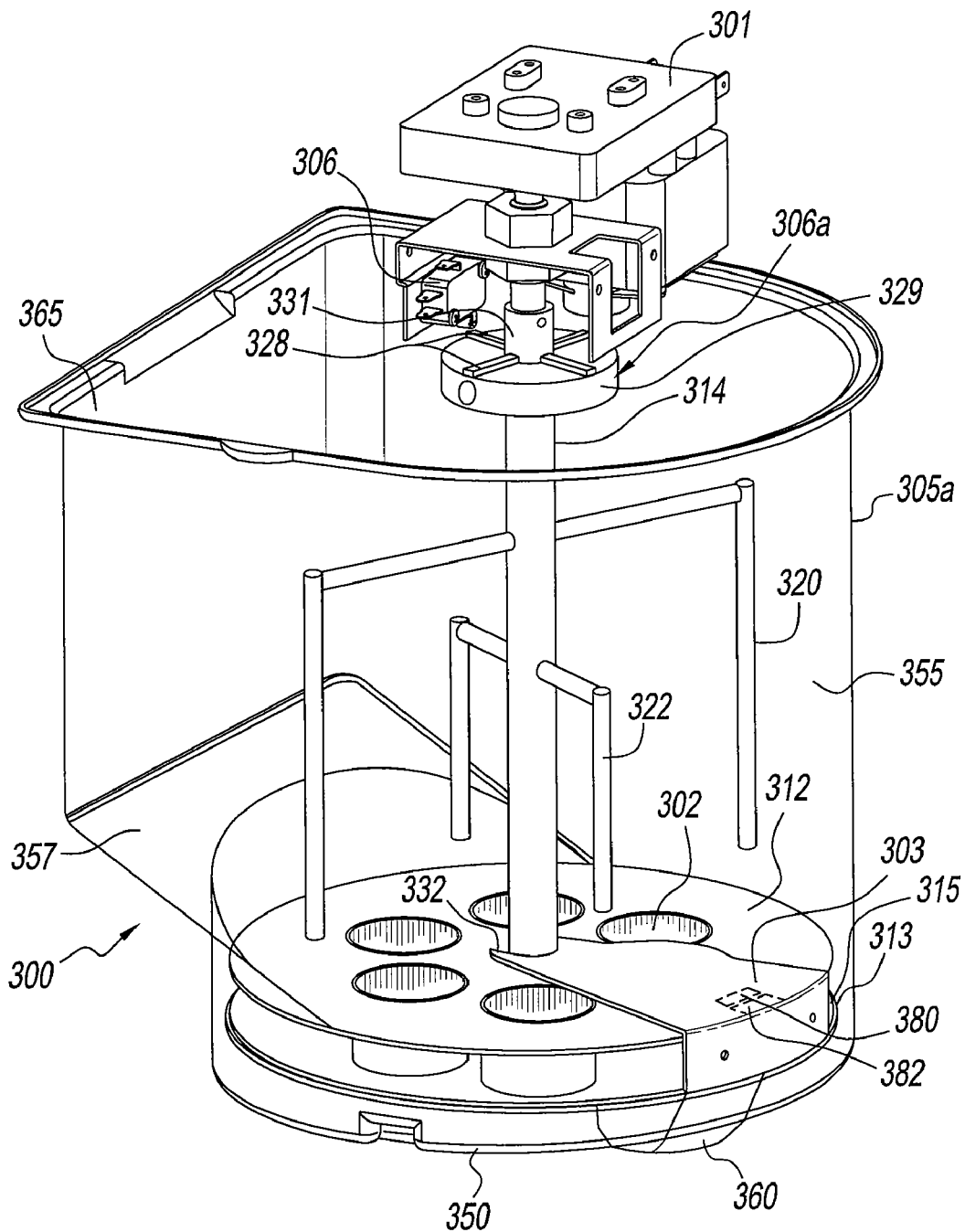
FIG. 1 is top left side perspective view of an ice bin, wedge and portion control assembly according to the present disclosure.

Referring to the drawings and in particular to FIG. 1, an exemplary embodiment of an ice storage and portion control module is generally referred to by 300. Ice storage and portion control module 300 has a portion control compartment shown in FIG. 1 as one or more portion cups 302 that are fillable with ice. Portion cups 302 are within an ice bin 305a that stores ice. Ice bin 305a has a wall 350 and a sidewall 355 that surrounds wall 350 and forms an opening 365. A portion of sidewall 355 may have an angled portion 357 that directs ice to portion cups 302 to fill portion cups 302 with the ice in ice bin 305a. Wall 350 has a hole 360 therethrough. Ice bin 305a is filled with ice through opening 365 over portion cups 302 so that portion cups 302 are filled with the ice by gravity with the ice in ice bin 305a. Portion cups 302 are moveable, for example, rotatable, as shown in FIG. 1, in ice bin 305a to move from a fill position to a dispense position so that a portion of ice dispensed from ice storage and portion control module 300 can be controlled.

Figure 2:
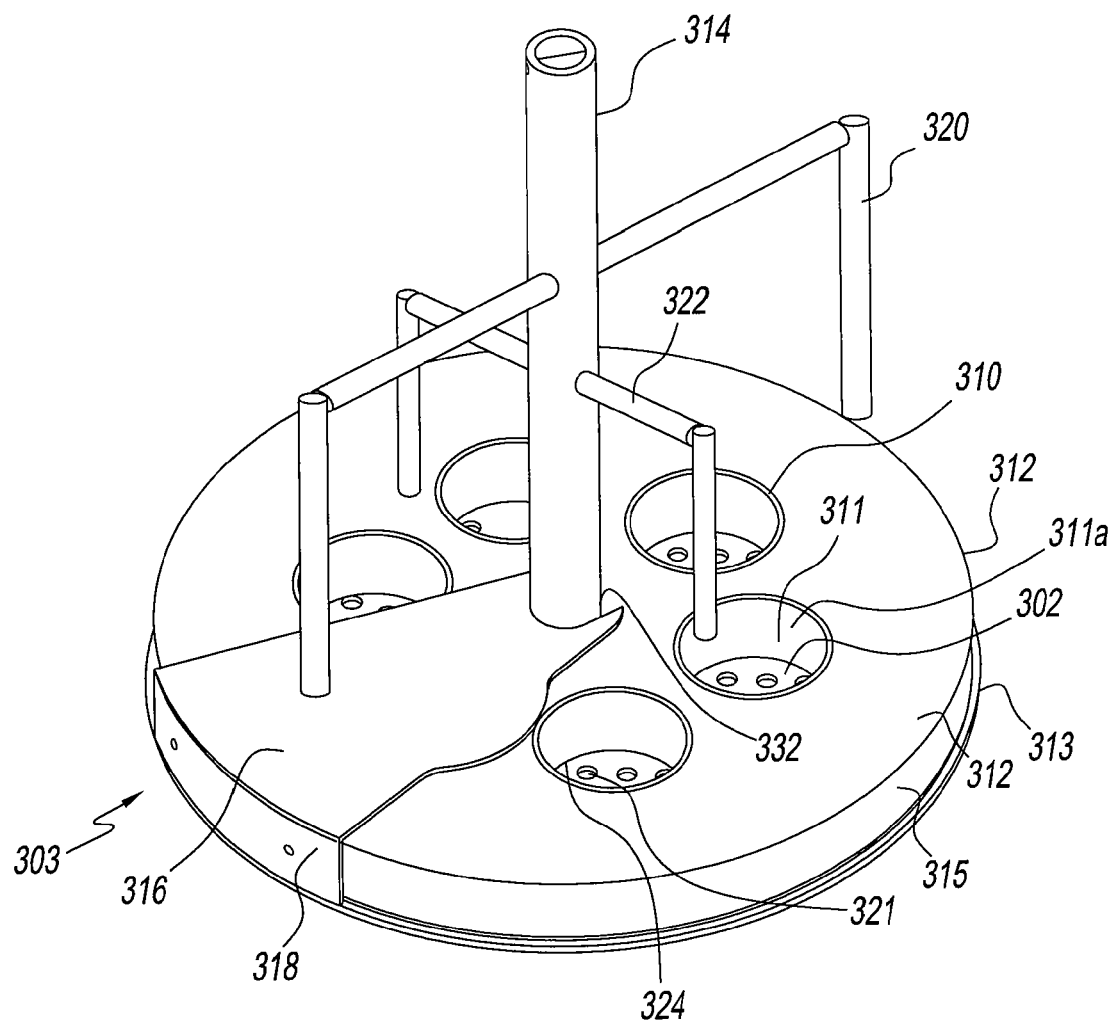
FIG. 2 is a top front perspective view of the wedge and portion control assembly of FIG. 1.

Referring to FIG. 2, a first plate 312 has apertures 310 therethrough. First plate 312 may have a circular shape. Each of apertures 310 has a sidewall 311 that extends from first plate 312. Portion cups 302 each have a dispensing port, for example, an opening 311a formed by sidewall 311. Portion cups 302 are at least formed by sidewall 311.

Figure 3:
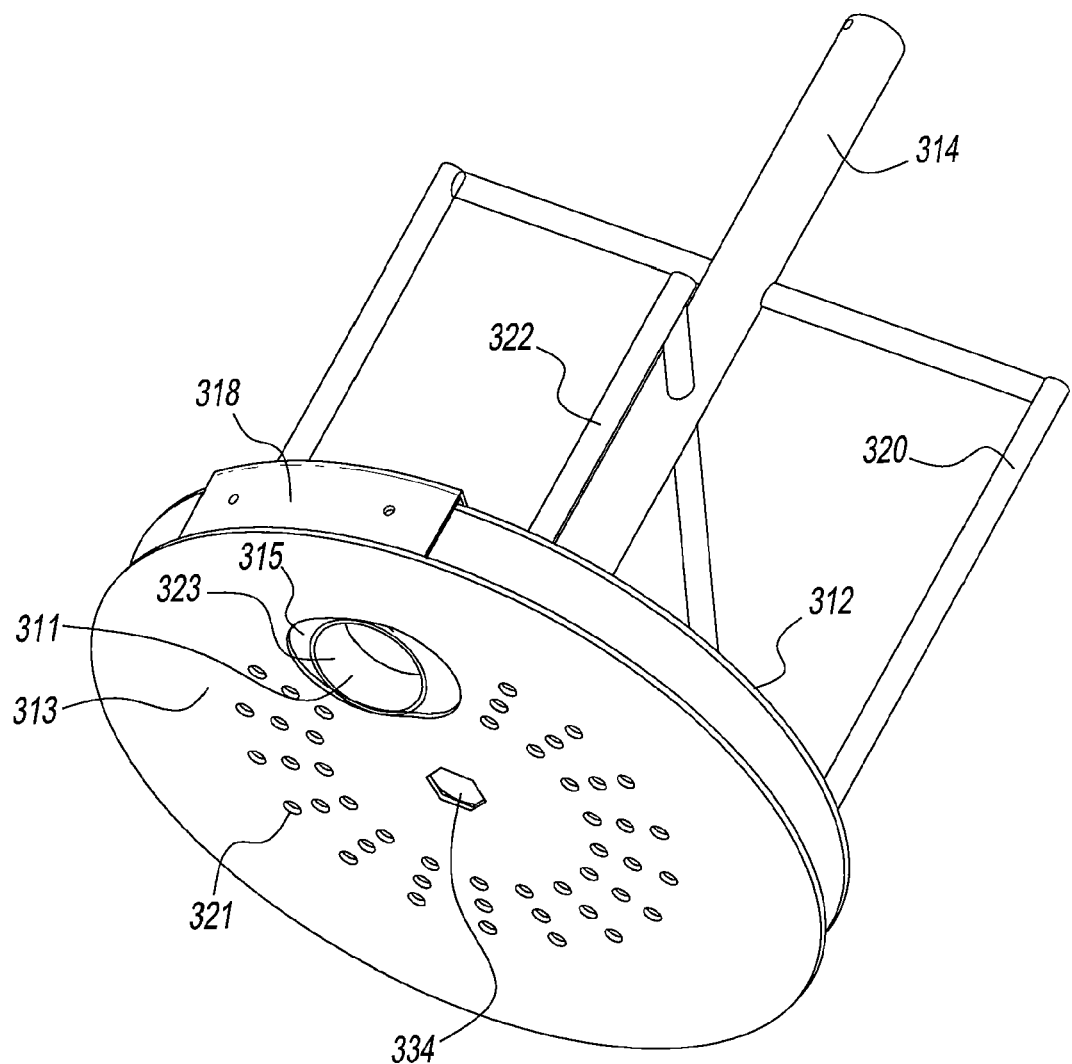
FIG. 3 is a bottom front perspective view of the wedge and portion control assembly of FIG. 1.
Figure 15:
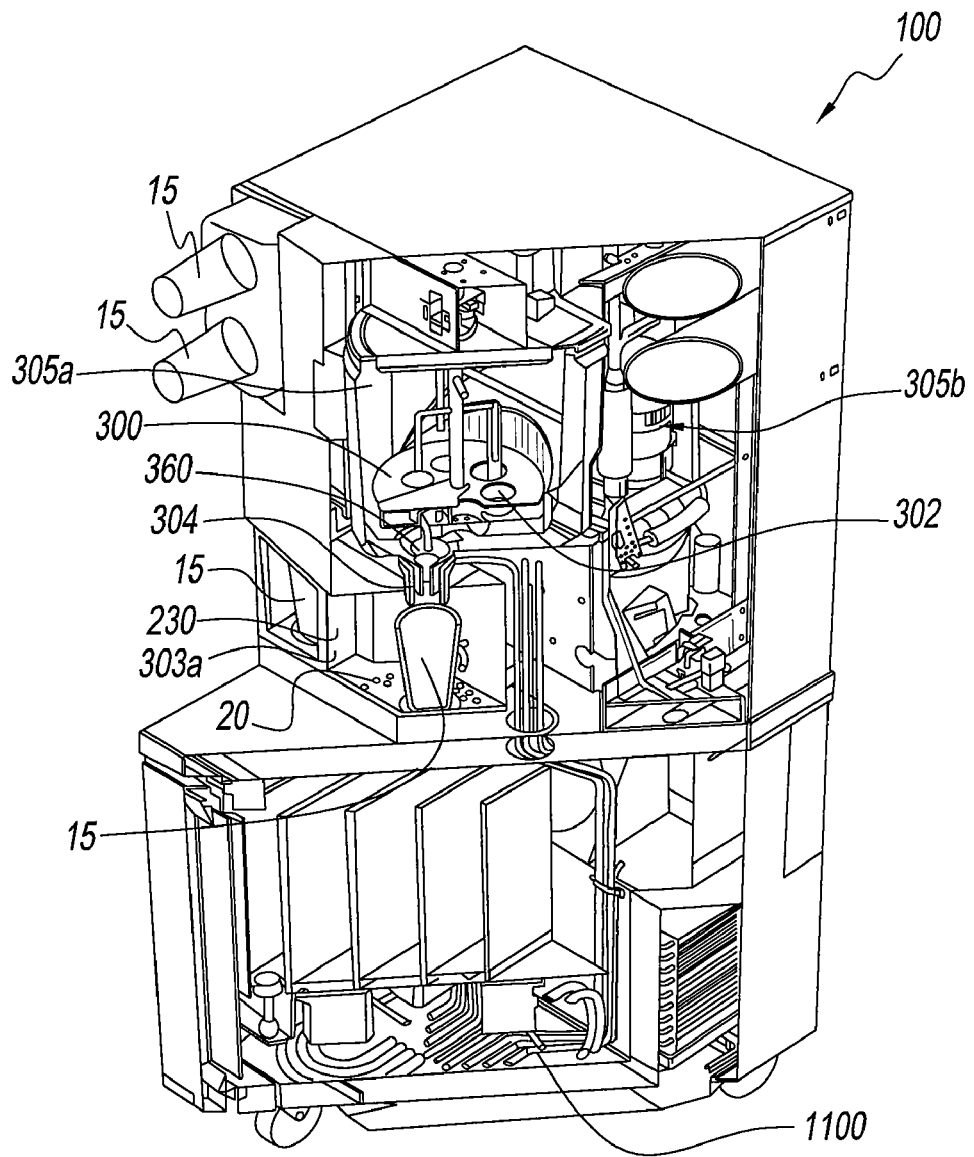
FIG. 15 is a top front left-side perspective view of an assembly that dispenses and mixes beverages of the present disclosure wherein the front left-side portion has been cut away to depict each of the ice making and portioning module, and dispensing module.

First plate 312 is positioned on a second plate 313 so that sidewall 311 of each aperture 310 abuts second plate 313 covering opening 311a to form an interior volume for each of portion cups 302. First plate 312 is connected to a third plate 315 by sidewall 311. Third plate 315 has apertures 324. Each of apertures 324 of third plate 315 aligns with one of apertures 310 through first plate 312 and opening 311a forming a passage therethrough. First plate 312, second plate 313, and/or third plate 315 is sized to cover wall 350 to control the ice dispensed from ice bin 305a through hole 360. Alternatively, third plate 315 may be omitted so that sidewall 311 is connected only to first plate 312. Another alternative omits first plate 312 so that sidewall 311 is connected only to third plate 315, however, sidewall 311 moving without first plate 312 through the ice in ice bin 305a during rotation may generate additional torque as compared to sidewall 311 that is connected to first plate 312. Portion cups 302 have a predetermined size to hold a predetermined volume of ice. Portion cups 302 may be any size, such as, for example, about 1 ounce. Referring to FIG. 3, second plate 313 has a dispensing aperture 323 that is aligned with hole 360 and a nozzle 304, as shown in FIG. 15.

As shown in FIGS. 2 and 3, water is removed from portion cups 302 via perforated holes 321 disposed in second plate 313. The ice may melt while within portion cups 302, and is removed by draining through perforated holes 321 while each of portion cups 302 are disposed on second plate 313 by gravity so that the water is not dispensed with the ice when each of portion cups 302 passes over dispensing aperture 323. The water that drains from portion cups 302 passes through perforated holes 321 onto wall 350 that surrounds hole 360. Wall 350 may be shaped, for example, angled, to direct the water to a drainage aperture (not shown) through wall 350 to drain the water out of ice bin 305a.

Figure 4:
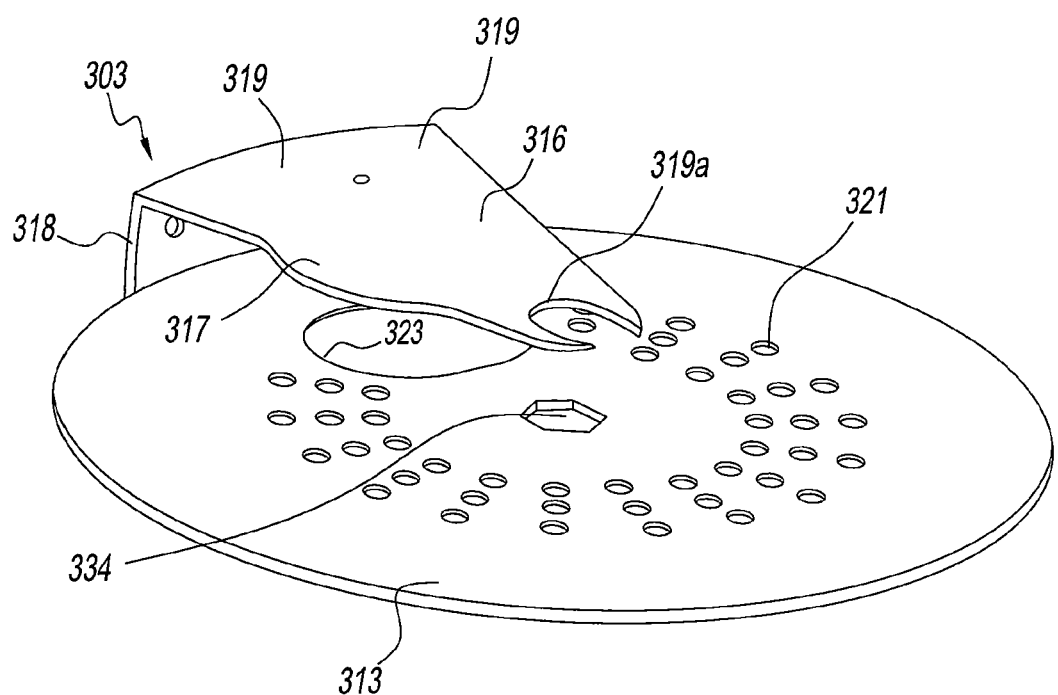
FIG. 4 is a top front perspective view of the wedge and second plate components of the portion control assembly of FIG. 1.
Figure 5:
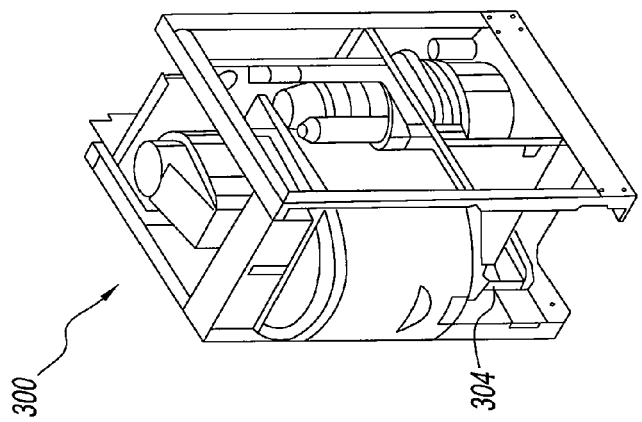
FIG. 5 is a front perspective view of an ice making and portioning module.
Figure 6:
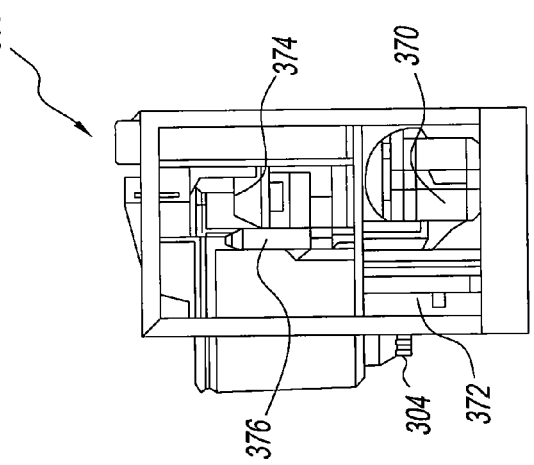
FIG. 6 is a side view of the ice making and portioning module of FIG. 5.
Figure 8:
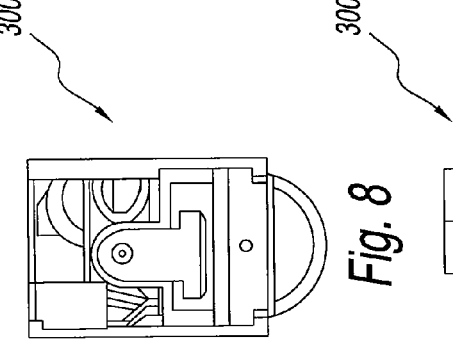
FIG. 8 is a top view of the ice making and portioning module of FIG. 5.
Figure 7:
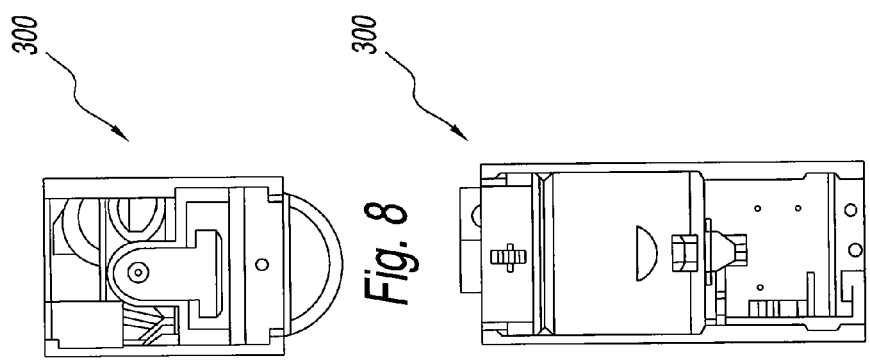
FIG. 7 is a front view of the ice making and portioning module of FIG. 5.
Figure 9:
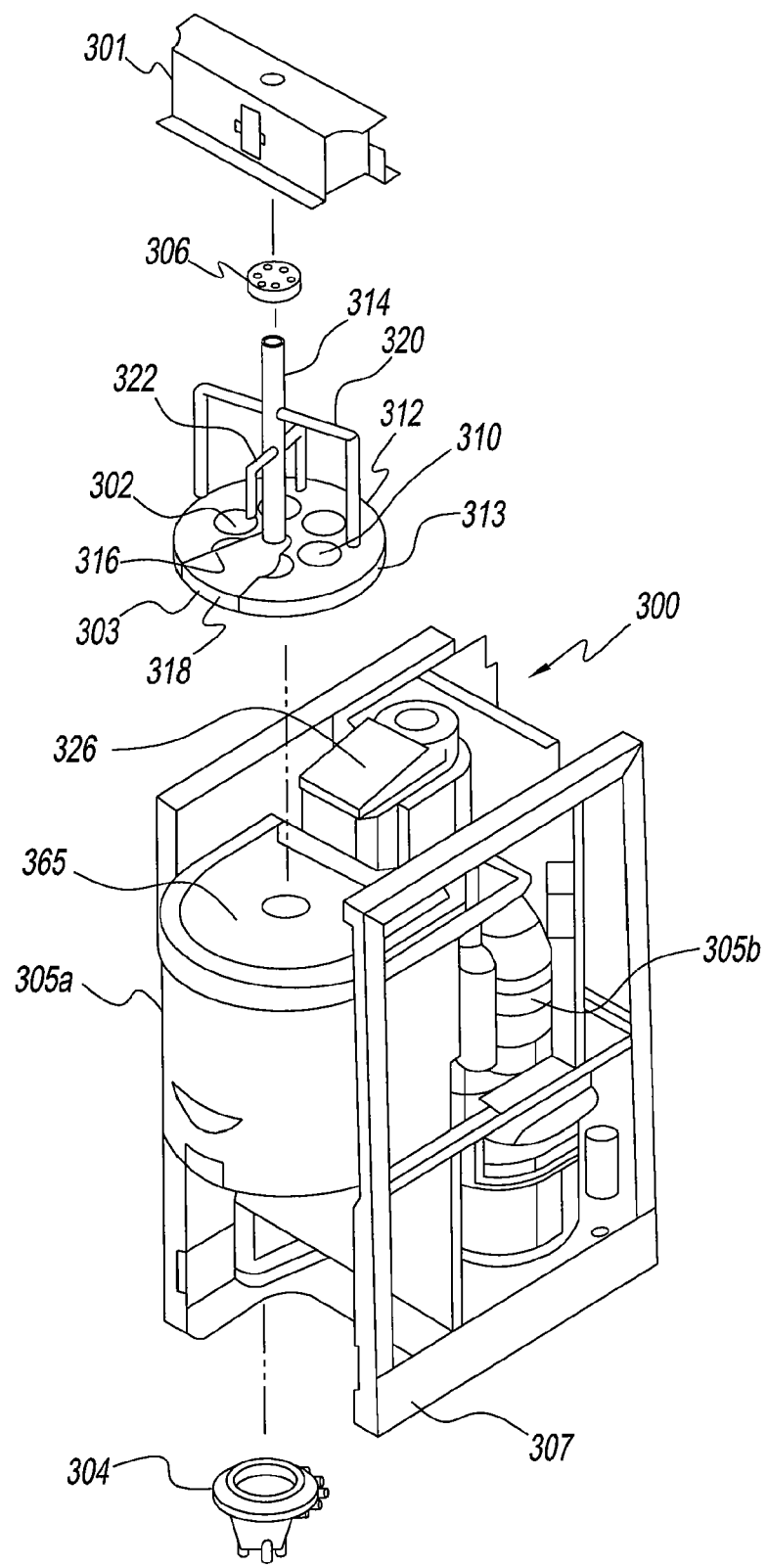
FIG. 9 is an exploded view of the ice making and portioning module of FIG. 5.
Figure 10:
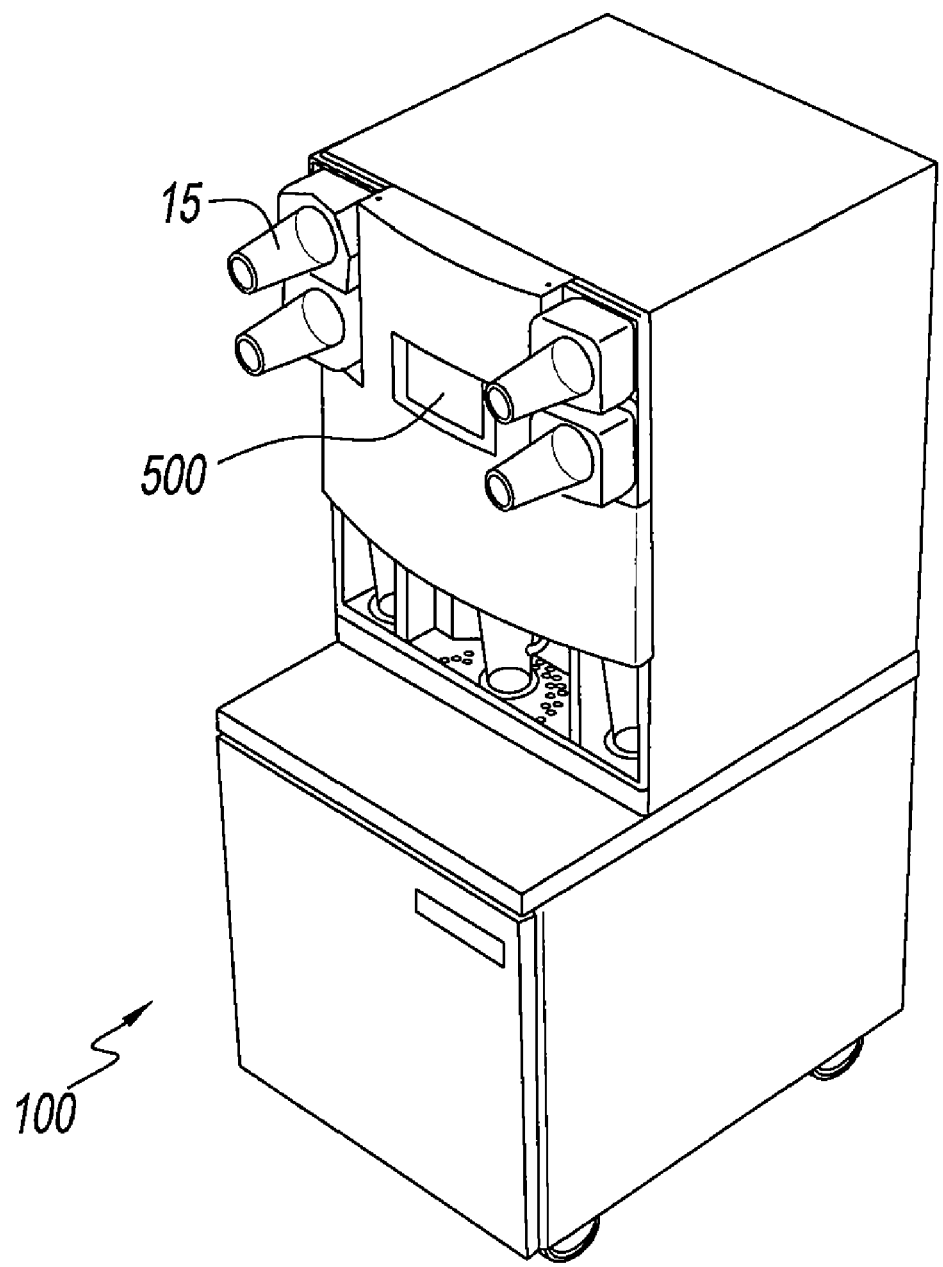
FIG. 10 is a front perspective view of an exemplary embodiment of an assembly that dispenses and mixes beverages according to the present disclosure.
Figure 13:
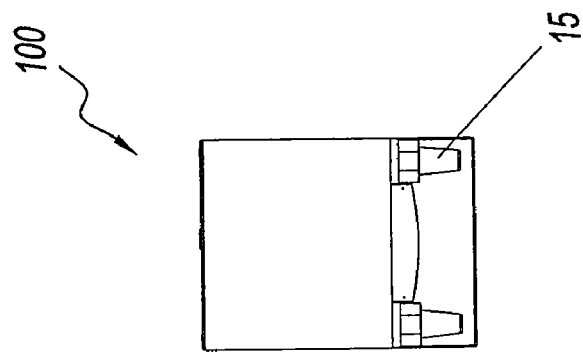
FIG. 13 is a top view of the assembly that dispenses and mixes beverages of FIG. 10.
Figure 12:
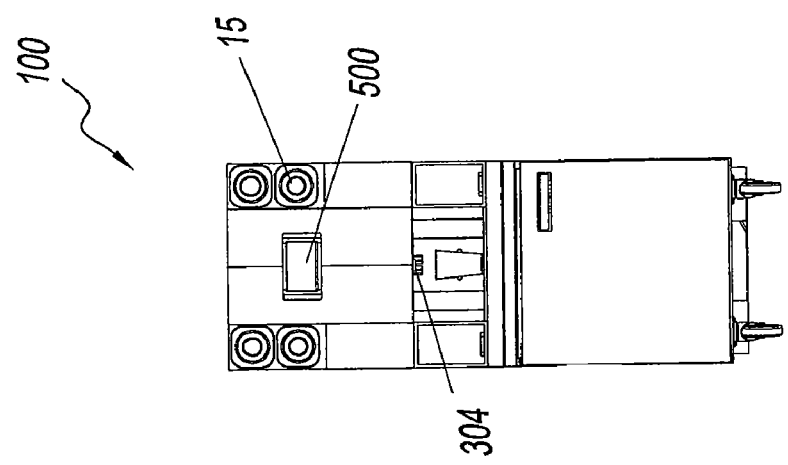
FIG. 12 is a front view of the assembly that dispenses and mixes beverages of FIG. 10.
Figure 11:
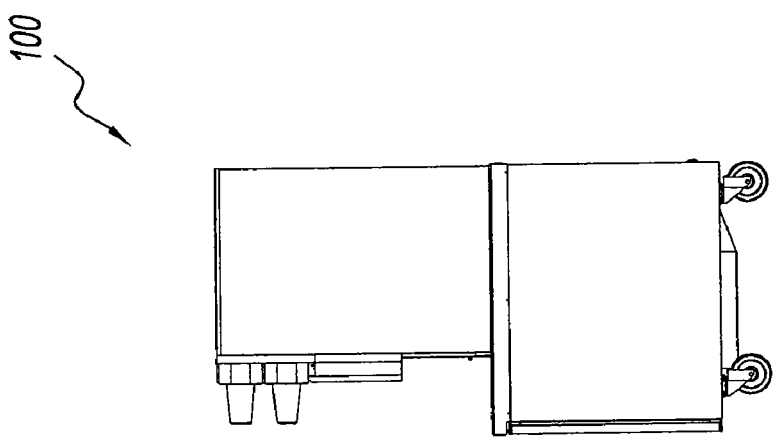
FIG. 11 is a side view of the assembly that dispenses and mixes beverages of FIG. 10.
Figure 14:
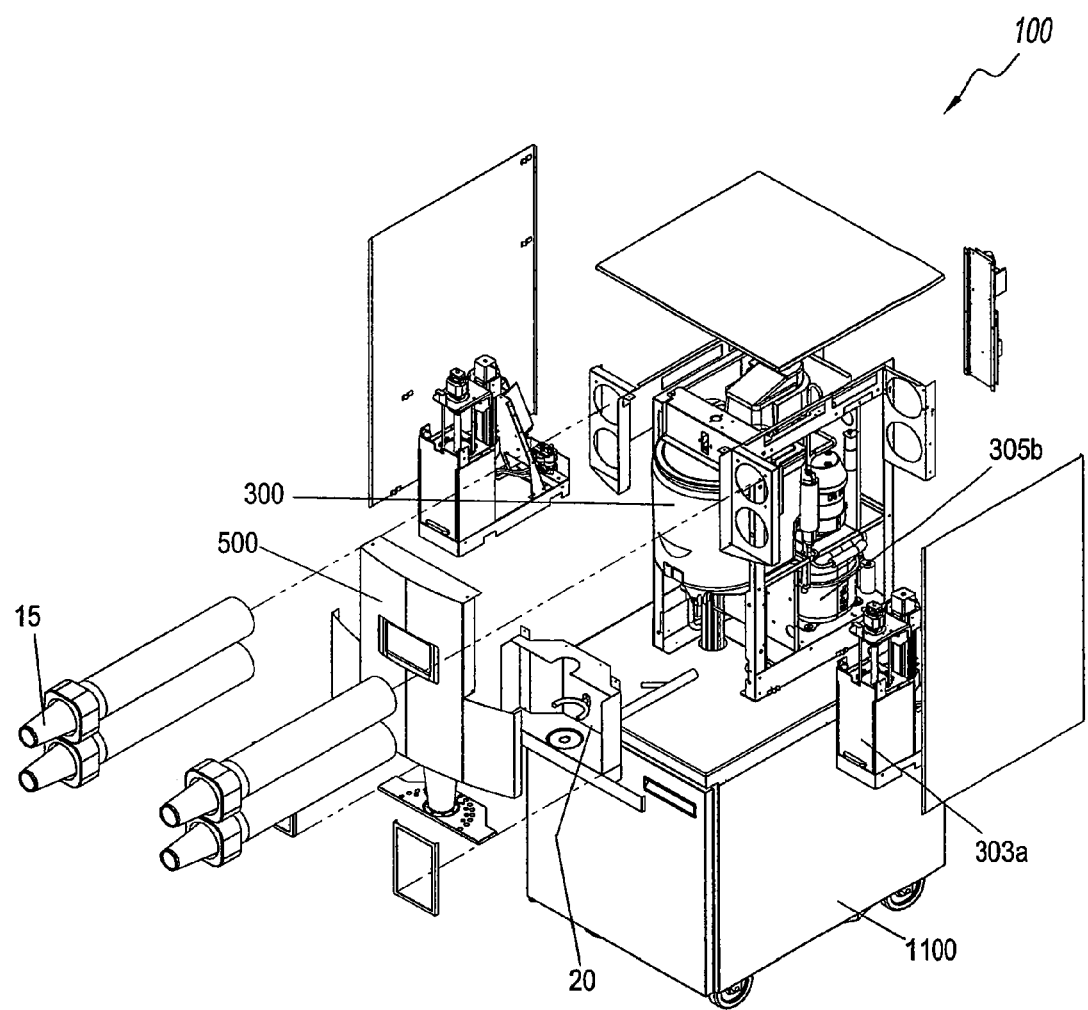
FIG. 14 is an exploded view of the assembly that dispenses and mixes beverages of FIG. 10.

Referring to FIG. 1, first plate 312 is connected to a drive assembly 301 by a connector bar 314 to rotate portion cups 302. Connector bar 314 is connected to first plate 312 through a first opening 332 so that first plate 312 rotates with connector bar 314. Connector bar 314 passes through a second opening 334, as shown in FIG. 4, in second plate 313. Drive assembly 301 may be, for example, a gear drive motor that connects to a power source. Drive assembly 301 rotates connector bar 314 that rotates portion cups 302 formed by first plate 312, sidewall 311 and third plate 315. Portion cups 302 that are filled with ice rotate with connector bar 314 on second plate 313 while second plate 313 remains stationary. Each of portion cups 302 remains filled with ice on second plate 313 until the portion cup passes over dispensing aperture 323 in second plate 313. When each of portion cups 302 is rotated to pass over dispensing aperture 323 in second plate 313, the ice in each of portion cups 302 passes through opening 311a and dispensing aperture 323 in second plate 313, through hole 360, and to dispenser nozzle 304, as shown in FIGS. 5, 6, 9 and 15, to dispense the ice out of ice storage and portion control module 300, for example, into cup 15, as shown in FIG. 15. The ice passes through opening 311a and dispensing aperture 323 in second plate 313, through hole 360, and to dispenser nozzle 304 due to the weight of the ice within the one of portion control cups 302 aligned with aperture 323.

Dispensing aperture 323 may be a plurality of dispensing apertures disposed within second plate 313 so that each of portion cups 302 remains filled with ice on second plate 313 until the portion cup passes over one of the plurality of dispensing apertures in second plate 313. When each of portion cups 302 is rotated to pass over one of the plurality of dispensing apertures in second plate 313, the ice therein passes through opening 311a and through the one of the plurality of dispensing apertures. More than one of portion cups 302 may each align with one of the plurality of dispensing apertures at the same time. The plurality of dispensing apertures disposed within second plate 313 allows the ice to be dispensed from ice storage and portion control module 300 to more than one container, for example, two or more cups 15.

FIG. 1 shows connector bar 314 that is connected to drive assembly 301 through a sensor assembly 306a having a sensor 306. Sensor 306, for example, is a microswitch or digital sensor. Connector bar 314 may include a cam or one or more protrusions 328 that fit within sensor 306 to form a cam follower and micro-switch for counting the number of portion cups 302, which dispense ice via dispensing aperture 323. Sensor assembly 306a may have sensor 306 and protrusions 328 that are on a structure, for example, a disk 329. Connector bar 314 is connected to disk 329 through an aperture 331 so that disk 329 rotates with connector bar 314 and portion cups 302. Each protrusion 328 rotates with one of portion cups 302 to correspond to a position of the one of portion cups 302. Each time one of protrusions 328 passes by sensor 306, sensor 306 detects the protrusion to indicate one of portion cups 302 has passed over dispensing aperture 323. Sensor 306 communicates an output indicative of each of protrusions 328 as it passes by sensor 306 to a portion control controller. The portion control controller counts an amount of portion control cups 302 that are rotated over dispensing aperture 323 based on the outputs from sensor 306. For example, sensor 306 may be a switch and protrusions 328 may each be a magnet so that the magnet attracts a portion of the switch when the magnet passes under the switch establishing contact between the magnet and the switch. As the magnet rotates away from the switch beyond a distance that the magnet attracts the portion of the switch, the contact between the magnet and the switch is broken causing sensor 306 to communicate an output to the portion control controller indicating that the one of portion cups 302 has passed over dispensing aperture 323 so that ice from the cup is dispensed. Alternatively, one or more signaling devices 380, such as, for example, magnets, may be disposed on first plate 312 corresponding to each of cups 302 to enable a sensor 382, as shown in FIG. 1, to provide a signal in communication with the portion control controller indicating that the one of portion cups 302 has passed over dispensing aperture 323 so that ice from the cup is dispensed. The portion control controller activates and deactivates drive assembly 301 based upon the output of sensor 306 to rotate a predetermined amount of portion control cups 302 over dispensing aperture 323 to dispense a predetermined amount of ice from within portion cups 302.

One or more actuators may be in communication with the portion control controller so that the portion control controller counts a number of actuations to determine a portion of ice that is to be dispensed as required by a menu recipe or beverage formula. For example, the portion control controller may divide a predetermined amount of ice needed for a beverage by the predetermined size of portion cups 302 to determine a number of portion cups 302 to rotate past dispensing aperture 323 and nozzle 304 to dispense the predetermined amount of ice from ice storage and portion control module 300 needed for the beverage. The portion control controller can activate drive assembly 301 to rotate portion control cups 302 past dispensing aperture 323 and nozzle 304 to dispense the ice, and deactivate drive assembly 301 after the portion control controller has counted the number of portion cups 302 that have passed over dispensing aperture 323 that equals the predetermined amount of ice needed for the beverage.

Ice storage and portion control module 300 controls an amount of ice dispensed out of ice storage and portion control module 300 by controlling an amount of portion cups 302 that pass over dispensing aperture 323. Portion cups 302, for example, are round and hold a predetermined amount of ice. The number of portion cups 302 that pass over dispensing aperture 323 determine the size of the drink being prepared. Portion cups 302 hold the predetermined amount of ice in the interior volume, and, as the size of the volume of ice increases or decreases, a number of portion cups 302 that pass over dispenser nozzle 304 increases or decreases based on the predetermined amount of ice needed for each beverage. The cam follower and micro-switch are used to count a number of portion cups 302 that pass over dispenser nozzle 304. Counting a number of portion cups 302 that pass over dispenser nozzle 304 prevents positioning one of portion cups 302 partially over dispenser nozzle 304. For example, the portion control controller may only deactivate drive assembly 301 when sensor does not detect one of protrusions 328 to ensure one of portion control cups 302 is not partially disposed over dispensing aperture 323. A weight of the ice in storage bin 305a of ice dispenser 305 causes the ice cups to fill. As the assembly rotates the ice is leveled by wedge 303.

FIGS. 2 and 3 show that as portion cups 302 rotate the ice is leveled by wedge 303 to provide accurate portioning. Portion control wedge 303 closes off apertures 310 of portion cups 302 as they pass towards dispensing aperture 323 and a dispense chute and hole 360 above dispenser nozzle 304 after being filled with ice, thereby ensuring that a consistent portion of ice is present in each cup 302 before it releases its content into hole 360 and the dispense chute disposed within nozzle 304. Wedge 303 levels ice in portion control cups 302 and prevents ice from falling into portion control cups 302 while each of portion control cups 302 is over dispensing aperture 323.

As shown in FIG. 4, wedge 303 may be a sheet metal wedge with a top portion 316, a side portion 318, and a bottom portion (not shown) that surround first plate 312 and second plate 313. Top portion 316 is substantially planar and substantially parallel with first plate 312 at a preselected height above cups 302. Top portion 316 has a protrusion 317 that extends from a body portion 319. Body portion 319 has a depression 319a on a side opposite side portion 318 surrounding a portion of connector bar 314 to allow connector bar 314 to rotate therein. Protrusion 317 is substantially planar and extends in a direction substantially parallel with first plate 312. Protrusion 317 displaces ice in ice bin 305a that is moved by the rotation of portion cups 303 into contact with wedge 302 prior to body portion 319 to reduce an amount of torque on drive assembly 301 that rotates portion cups 302 in comparison to a wedge without protrusion 317 having a straight edge.

Referring to FIG. 1, ambient air may enter ice bin 305a through hole 360 melting some of the ice in proximity to hole 360. A controller may rotate drive assembly 301 to rotate portion cups 302 at a predetermined time interval so that at least one of portion cups 302 dispenses the ice therefrom out of ice storage and portion control module 300 to remove melted ice from ice storage and portion control module 300 in proximity to hole 360.

Connector bar 314 may be connected to an agitator that moves ice in ice bin 305a. The agitator moves the ice in ice bin 305a to separate ice and prevent ice from congealing, and the agitator facilitates the direction of ice into portion control cups 302. Referring to FIGS. 1-3, connector bar is connected to stirrer bars 320 and 322. Stirrer bars 320 and 322 extend from connector bar 314 into ice bin 305a and rotate with connector bar 314. Stirrer bars 320 and 322 are ice agitators that rotate through the ice in storage bin 305a shown in FIG. 1. Their purpose is to keep the ice from clumping together which would prevent the ice from filling into portion cups 302.

Alternatively, first plate 312 is connected to drive assembly 301 by a first bar to move portion cups 302, and the agitator is connected to drive assembly 301 by a second bar to move the agitator in ice bin 305a. The first bar may be rotatable within the second bar. Drive assembly 301 moves in a first direction and a second direction that is opposite the first direction. In the first direction, drive assembly engages the first bar moving portion cups 302 to dispense ice and engages the second bar to agitate the ice. In the second direction, drive assembly 301 only engages the second bar moving the agitator through the ice in ice bin 305a to only agitate the ice while portion cups 302 do not move. For example, a ratchet coupling is connected to the first bar so that a mating coupling of drive assembly 301 engages the first bar in the first direction and does not engage the first bar in the second direction.

Another example includes the first bar having a first ratchet coupling and the second bar having a second ratchet coupling so that a mating coupling of drive assembly 301 engages the first bar in the first direction and does not engage the first bar in the second direction and engages the second bar in the second direction and does not engage the second bar in the first direction. In this example, portion cups 302 and the agitator only move separately. A further alternative includes the first bar being connected to a first drive assembly and the second bar being connected to a second assembly so that each of the first bar that moves portion cups 302 and the second bar that moves the agitator can be selectively and separately moved by different drive assemblies.

Referring to FIGS. 6-9, ice storage and portion control module 300 includes an ice maker 305b. Alternatively, ice maker 305b may be separate from ice storage and portion control module 300. Ice maker 305b may be any ice maker, and, preferably an ice maker that forms flakes of ice. For example, ice maker 305b may include an ice making head of cylindrical configuration in which a water container that is filled with water from a water source has at least one refrigerated wall forming a freezing chamber cooled by a flow of refrigerant gas, and a motor driven scraper which continuously breaks up ice forming on the refrigerated surface into ice flakes. The refrigerant gas may be cooled by a refrigeration cycle, such as, for example, a vapor compression cycle that includes a compressor 370, condenser 372, expansion valve 376, and evaporator 374. One or more of the compressor, condenser, expansion valve, and evaporator may be integral with or remote from ice storage and portion control module 300. For example, compressors may create undesirable noise and may be remotely located from the rest of ice storage and portion control module 300. Ice maker 305b may include an axially-extending auger or auger assembly that is rotatably disposed within the freezing chamber and generally includes a central body portion with one or more generally spirally-extending flight portions thereon disposed in the space between the central body portion and the refrigerated wall in order to rotatably scrape ice particles from the cylindrical freezing chamber. A drive means assembly rotatably drives the auger such that when make-up water is introduced into the freezing chamber through a suitable water inlet and frozen therein, the rotating auger forcibly urges quantities of ice particles through the freezing chamber to be discharged through an ice outlet end.

Nugget ice may be made from the flakes by passing the flakes of ice through an extruder head where a nugget shape is formed. Nugget ice is different from cube style ice in that the nugget is not homogenous but is multiple flakes of ice compressed into a nugget. Nugget ice is softer ice (easier to chew) that requires less power to mix into a beverage. The nuggets of ice are pushed through the extruder head and this force can be used to transport the ice to ice bin 305a of ice storage and portion control module 300, which may allow for larger ice output. Ice maker 305b reduces an overall sound level and allows for operation near a front counter or drive-through window without impacting communications. The use of nugget ice also allows the operator to use single serving cup for dispensing, blending and serving the consumer because the stress of blending cubed ice is reduced.

Ice maker 305b may be removably connected to ice storage and portion control module 300. Ice maker 305b may be removable so that another ice maker may be connected to ice storage and portion control module 300 to portion and dispense another type of ice, for example, ice maker 305b may make nugget ice that may be replaced by another ice maker that makes flake ice.

Ice maker 305b is connected with ice bin 305a so that ice made by ice maker 305b is dispensed into ice bin 305a through a conduit 326 that is connected to opening 365. Ice bin 305a may have a sensor, for example, a photosensor, that detects if the ice in ice bin 305a is below a predetermined level. The sensor communicates with an ice maker controller of ice maker 305b so that ice maker 305b makes ice and dispenses the ice therefrom into ice bin 305a when the ice is below the predetermined level in ice bin 305a.

Referring to FIGS. 10-15, ice storage and portion control module 300 may be used in an assembly that dispenses and mixes beverages 100. Referring to FIG. 15, assembly that dispenses and mixes beverages 100 has an onboard ice maker 305b, ice storage and portion control module 300, a flavor/ingredient dispensing module 1100, and a blender/mixer/cleaning module 303a. In use, cup 15 is placed on container holder portion 20 of assembly 100. A user may make selections through a user interface controller that incorporates a button panel, such as a control panel 500 shown in FIG. 10, in order to dispense and mix a preselected beverage, for example, a smoothie drink that includes ice and flavor ingredients. Ice storage and portion control module 300 dispenses ice to cup 15 through nozzle 304 and ingredient dispenser assembly 1100 dispenses an ingredient, such as, for example, a fruit base to cup 15 through nozzle 304. Nozzle 304 has separate apertures for each ingredient from ingredient dispenser assembly 1100 and ice dispensed from ice storage and portion control module 300 to prevent the ice and ingredients from contacting one another in nozzle 304 and contamination therefrom. As shown in FIG. 15, dispenser nozzle 304 extends through a top side of container holder portion 20 and is aligned with hole 360 and dispensing aperture 323. Cup 15 is then transferred into interior volume 230 of blender/mixer/cleaning module 303a. Door (not shown) is moved to a closed position and a mixer (not shown) mixes the ice and fruit base. Upon completion of the mixing, the door is moved to an opened position and cup 15 is removed and delivered to the consumer. The door is then closed and interior volume 230 is rinsed and/or sanitized.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

Advantageously, ice storage and portion control module 300 generates ice through a fully integrated on-board ice system. Ice storage and portion control module 300 may, for example, have a 20-pound ice storage system that has the capability to create an additional 10 pounds of ice each hour, with a peak total of 270 pounds per day. Having ice generation on board removes the risk of injury through slips and falls, and it decreases the chance of bacterial contamination through mishandling. Additionally, the ice used in ice maker 305b may be nugget-style ice, which is easier to fracture and blend down into the smoothie consistency. All of this allows for a perfectly blended beverage, for example, smoothie that fits within a normal QSR delivery time.

Each beverage, for example, smoothie is blended in its own cup, allowing the entire beverage or drink to be delivered to the customer and, in turn, raising product yield. Having each drink blended in its own cup improves flavor control and reduces allergy issues caused through cross-contamination. Assembly may, for example, consistently provide twenty 16-ounce drinks per hour and, at peak capabilities, forty-five 16-ounce drinks for one-hour bursts. Money is also saved through the elimination of small wares or blender pots that were purchased and stored by restaurant owners in the past. Blender pots that are currently used are made of hard plastic, with the ability to withstand the forces used to crush ice into an acceptable consistency for a smoothie drink. Grinding the cube-style ice, most commonly found in QSRs, would put too much stress on the machine's blender and the customer's cup in contrast to flake or nugget ice.

Additionally, nugget ice is softer than the more commonly known cube ice, and it is formed in a freeze barrel with an internal auger that continually scrapes the freeze surface. This flake-style ice is moved to the top of the freeze barrel by the ice auger, where it is extruded into the ice nugget. The resulting smaller ice greatly reduces the amount of blending required to create the drink. Additionally, the noise generated from the blending process is reduced by using this smaller nugget ice. This becomes especially important when the equipment is placed in the proximity of the front counter or near a drive-through window.

It has been found by the present inventors that size limitations (footprint) may be achieved by a configuration of the components of ice storage and portion control module 300 that includes ice maker 305*b*.

Ice storage and portion control module 300 maintains ice dispense accuracy. The ice dispense is divided into portion cups. As the drink size changes, the number of portion control cups 302 dropping ice into the beverage increases or decreases to match. To measure the number of ice dispenses, micro switches (located outside of the ice bin) are incorporated to count the number of cups. This method provides consistent ice delivery regardless of the level of ice in ice bin 305*a*.

Ice storage and portion control module 300 may have ice maker 305*b* with capability to store 9 kilograms of ice in addition to ice making capabilities. Ice maker 305*b* may generate hard nugget ice. Ice maker 305*b* may have the capability to generate a minimum of 240 pounds of ice per day. Ice maker 305*b* may operate on 120 volts 60 hertz +/−10%. Ice maker 305*b* may have provisions for 220 50 Hertz operation for Europe +/−10%.

The ice may be dispensed by ice storage and portion control module 300 during a smoothie making process or dispensed exclusively (i.e. without flavors or water). The ice may be dispensed by ice storage and portion control module 300 in a portion amount that allows scaling for various drink cup sizes. The ice amount may be dispensed by ice storage and portion control module 300 with an accuracy of ±10%. Ice storage and portion control module 300 may be incorporated with a system that provides a button for ice only dispensing. Upon selection of the ice-only button, the system may proceed to cup size selection. The ice-only button may only be available when no flavors are selected. Conversely, upon selection of a flavor the ice-only button may be disabled.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof Therefore, it is intended that the present disclosure not be limited to the particular embodiment(s) disclosed as the best mode contemplated, but that the disclosure will include all embodiments falling within the scope of the appended claims.

What is claimed is:

1. An ice portion control module comprising:
   an ice bin for storing ice;
   a base in said ice bin having one or more portion control compartments, said one or more portion control compartments having an interior volume to hold a predetermined portion of said ice;
   an actuator which moves said one or more portion control compartments between a fill position wherein said one or more portion control compartments holds said ice, and a dispense position wherein said predetermined portion of said ice is dispensed out of said one or more portion control compartments; and
   a controller that counts a number of said one or more portion control compartments moved to said dispense position and deactivates said actuator from moving said one or more portion control compartments after said controller counts up to a predetermined number of said one or more portion control compartments moved to said dispense position to dispense a predetermined total amount of said ice.

2. The ice portion control module of claim 1, wherein said base is formed by a pair of oppositely disposed first and second plates, wherein said one or more portion control compartments is formed by at least one sidewall disposed between said first and second plates, and wherein said first plate comprises one or more openings associated with said one or more portion control compartments to allow said ice to move from said ice bin into said one or more portion control compartments when said one or more portion control compartments is in said fill position.

3. The ice portion control module of claim 2, wherein said second plate has a dispensing aperture in communication between said one or more portion control compartments and a dispensing apparatus in said dispensing position, thereby allowing said predetermined portion of the ice in said one or more portion control compartments to be dispensed into said dispensing apparatus.

4. The ice portion control module of claim 3, wherein said first plate is rotatable over said second plate to rotate said one or more portion control compartments.

5. The ice portion control module of claim 4, wherein said second plate is stationary while said first plate rotates.

6. The ice portion control module of claim 4, wherein said one or more portion control compartments has a dispensing port that is covered by said second plate in said fill position, and wherein said one or more portion control compartments rotates on said second plate so that said dispensing port of said one or more portion control compartments passes over said dispensing aperture in said second plate in said dispense position thereby allowing said predetermined portion of the ice in said one or more portion control compartments to be dispensed into said dispensing apparatus.

7. The ice portion control module of claim 2, wherein said second plate has a plurality of drainage holes which allow for water to drain from said ice.

8. The ice portion control module of claim 6, further comprising a sensor that detects and communicates to said controller when said one or more portion control compartments is in said dispense position.

9. The ice portion control module of claim 8, wherein said first plate is connected to a drive assembly by a connector bar to rotate said one or more portion control compartments, and wherein said connector bar connects to a structure having one or more protrusions that corresponds to and rotates with said one or more portion control compartments and communicates with said sensor when said one or more portion control compartments is in said dispense position.

10. The ice portion control module of claim 8, wherein said first plate is connected to a drive assembly by a connector bar to rotate said one or more portion control compartments, and further comprising one or more signaling devices disposed on said first plate corresponding to said one or more portion control compartments to enable said sensor to provide a signal in communication with said controller.

11. The ice portion control module of claim 10, wherein said controller counts a number of said one or more portion control compartments that pass over said dispensing aperture so that said ice from said one or more portion control compartments is dispensed out of the ice portion control module.

12. The ice portion control module of claim 10, wherein said one or more signaling devices is one or more magnets.

13. The ice portion control module of claim 2, further comprising an agitator that moves in said ice bin.

14. The ice portion control module of claim 2, wherein said first plate is connected to a drive assembly by a connector bar to rotate said portion control compartment, wherein said drive assembly is connected to an agitator to move said agitator in said ice bin, wherein said drive assembly moves in a first direction and a second direction, and wherein said drive assembly engages said connector bar to move said one or more portion control compartments in said first direction and said drive assembly only engages said agitator to move said agitator through said ice in said ice bin in said second direction.

15. The ice portion control module of claim 2, further comprising a leveling blade that ensures a consistent volume of said ice in said one or more portion control compartments.

16. The ice portion control module of claim 15, wherein said leveling blade is substantially planar and substantially parallel with said first plate at a preselected height above said one or more portion control compartments, wherein said leveling blade has a protrusion that extends from a body portion, and wherein said protrusion is substantially planar and extends in a direction substantially parallel with said first plate.

17. A method for portioning ice, the method comprising:
filling an interior volume of a portion control compartment in a base with a predetermined portion of ice when said portion control compartment is in a fill position, said base being in an ice bin for storing said ice;
moving said portion control compartment between said fill position and a dispense position by an actuator;
counting a number of said one or more portion control compartments moved to said dispense position; and
deactivating said actuator from moving said one or more portion control compartments after counting up to a predetermined number of said one or more portion control compartments moved to the dispense position to dispense a predetermined total amount of said ice.

18. The method of claim 17, wherein said base has one or more portion control compartments; and a dispensing aperture in communication between a selected portion control compartment and said dispensing aperture in said dispense position.

19. The method of claim 18, wherein said base is formed by a pair of oppositely disposed first and second plates, wherein said one or more portion control compartments is formed by at least one sidewall disposed between said first and second plates, wherein said first plate comprises an opening associated with said one or more portion control compartments to allow said ice to move from said ice bin into said one or more portion control compartments when said one or more portion control compartments is in said fill position.

20. The method of claim 19, wherein said moving comprises rotating said first plate and said sidewall, while said second plate remains stationary so that said dispensing aperture that is disposed within said second plate allows said predetermined portion of the ice in said one or more portion control compartments to be removed therefrom when said one or more portion control compartments is aligned with said dispensing aperture in said dispense position.

21. The method of claim 19, wherein said one or more portion control compartments is a plurality of portion control compartments and said dispensing aperture is a plurality of dispensing apertures disposed within said second plate, wherein said moving comprises rotating said first plate and said sidewall of each of said plurality of portion control compartments, while said second plate remains stationary so that each of said plurality of portion control compartments aligns with one of said plurality of dispensing apertures in said dispense position to allow said predetermined portion of the ice in each of said plurality of portion control compartments to be removed therefrom.

22. The method of claim 17, wherein said counting further comprises detecting and communicating to a controller when each of said one or more portion control compartments is in said dispense position, wherein said first plate is connected to a drive assembly by a connector bar to move said one or more portion control compartments, wherein said connector bar connects to a structure having one or more protrusions that rotates with said connector bar, wherein said one or more protrusions corresponds to and rotates with said one or more portion control compartments and communicates with a sensor when said one or more portion control compartments is in said dispense position.

23. The method of claim 17, wherein said counting further comprises detecting and communicating to a controller when each of said one or more portion control compartments is in said dispense position, wherein said first plate is connected to a drive assembly by a connector bar to rotate said one or more portion control compartments, and further comprising one or more signaling devices disposed on said first plate corresponding to said one or more portion control compartments to enable a sensor to provide a signal in communication with a controller.

24. The method of claim 23, wherein said one or more signaling devices is one or more magnets.

25. The method of claim 19, further comprising draining water disposed within each of said one or more portion control compartments through a plurality of holes through said second plate.

26. The method of claim 19, wherein said interior volume of said portion control compartment is filled with the ice from said ice bin, and further comprising passing a leveling blade over said opening associated with said one or more portion control compartments closing off said opening as said one or more portion control compartments moves towards said dispensing aperture, thereby ensuring that a consistent portion of said ice is present in said one or more portion control compartments before it releases its contents into said dispensing aperture.

27. The method of claim 17, further comprising moving an agitator through the ice in said ice bin.

28. The method of claim 20, wherein said first plate is connected to a drive assembly by a connector bar to rotate said portion control compartment, wherein said drive assembly is connected to an agitator to move said agitator in said ice bin, wherein said drive assembly moves in a first direction and a second direction, and wherein said drive assembly engages said connector bar to move said portion control compartment in said first direction and said drive assembly only engages said agitator to move said agitator through said ice in said ice bin in said second direction.

29. An ice portion control module comprising:

an ice bin for storing ice that has at least one sloped wall to direct said ice into one or more portion control compartments, said one or more portion control compartments having one or more dispensing ports; and one or more actuators that move one or more devices to open and close said one or more portion control compartments and one or more dispensing ports, wherein said one or more portion control compartments holds said ice when said one or more dispensing ports is closed, and whereby said ice in said one or more portion control compartments is dispensed out of said one or more dispensing ports when opened by an actuation of said one or more actuators, wherein said one or more actuators are in communication with a controller that counts a number of actuations to determine a portion as required by a menu recipe or beverage formula.

30. The ice portion control module of claim 29, further comprising an agitator that moves in said ice bin.

31. An ice portion control module comprising:

an ice bin for storing ice from which said ice is directed into one or more portion control compartments, said one or more portion control compartments having one or more dispensing ports;

an agitator that moves in said ice bin; and one or more actuators that move one or more devices to open and close said one or more portion control compartments and one or more dispensing ports, wherein said one or more portion control compartments holds said ice when said one or more dispensing ports is closed, and whereby a predetermined portion of said ice in said one or more portion control compartments is dispensed out of said one or more dispensing ports when opened by an actuation of said one or more actuators, wherein said agitator moves independently from said one or more devices.

32. The ice portion control module of claim 31, wherein said one or more actuators are in communication with a controller that counts a number of actuations to determine a portion of said ice as required by a menu recipe or beverage formula.

33. The ice portion control module of claim 31, wherein said agitator prevents said ice from congealing and facilitates the direction of said ice into said one or more portion control compartments.

\* \* \* \* \*